(12) United States Patent
Cooper et al.

(10) Patent No.: US 8,725,323 B2
(45) Date of Patent: May 13, 2014

(54) SYSTEM AND METHOD FOR AUTOMATED ESTABLISHMENT OF A VEHICLE CONSIST

(75) Inventors: Jared Klineman Cooper, Melbourne, FL (US); Brian Joseph McManus, Fort Worth, TX (US); Frank Wawrzyniak, Melbourne, FL (US); Ralph C. Haddock, III, Melbourne, FL (US); Robert James Foy, Melbourne, FL (US); James Glen Corry, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 85 days.

(21) Appl. No.: 13/593,258

(22) Filed: Aug. 23, 2012

(65) Prior Publication Data
US 2012/0318931 A1 Dec. 20, 2012

Related U.S. Application Data

(63) Continuation-in-part of application No. 11/552,602, filed on Oct. 25, 2006, now Pat. No. 8,280,566.

(60) Provisional application No. 60/792,428, filed on Apr. 17, 2006.

(51) Int. Cl.
*B61L 3/00* (2006.01)
*B60T 13/66* (2006.01)

(52) U.S. Cl.
CPC ............ *B60T 13/665* (2013.01); *Y02T 10/7258* (2013.01)
USPC ......................................... 701/19; 246/167 R

(58) Field of Classification Search
CPC . B61L 2205/04; B61L 25/021; B61L 25/026; B61L 3/008; B61L 3/006; B60L 2200/26; B60T 13/665; Y02T 10/7258
USPC ...... 701/19, 20, 123; 246/167 R, 182 R, 186, 246/187 R, 187 A; 105/26.05, 61
See application file for complete search history.

(56) References Cited

U.S. PATENT DOCUMENTS

| | | | |
|---|---|---|---|
| 5,950,967 | A | 9/1999 | Montgomery |
| 7,021,589 | B2 | 4/2006 | Hess, Jr. et al. |
| 2002/0072833 | A1 | 6/2002 | Gray |
| 2003/0034423 | A1 | 2/2003 | Hess |
| 2003/0120400 | A1 | 6/2003 | Ahmed |
| 2003/0183729 | A1 | 10/2003 | Root |

FOREIGN PATENT DOCUMENTS

| | | |
|---|---|---|
| EP | 1253059 | 10/2002 |
| RU | 2238860 | 10/2004 |

OTHER PUBLICATIONS

Written Opinion of the International Searching Authority for PCT/US2007/066011, dated Nov. 24, 2008.

*Primary Examiner* — Mary Cheung
(74) *Attorney, Agent, or Firm* — GE Global Patent Operation; John A. Kramer

(57) ABSTRACT

A method for controllably linking propulsion units in a vehicle consist includes transmitting a linking signal having an identity of a lead propulsion unit. A remote propulsion unit is remotely controlled by the lead unit when the identity matches a designated identity stored onboard the remote unit. A de-linking signal is transmitted from the lead unit when the lead unit is to be decoupled from the vehicle consist. The de-linking signal includes a replacement identity of a replacement propulsion unit. A replacement linking signal is transmitted from a second lead unit. The remote propulsion unit allows the second lead propulsion unit to remotely control the operations of the remote propulsion unit when replacement identity stored onboard the remote propulsion unit matches an identity that is communicated in the replacement linking signal.

28 Claims, 7 Drawing Sheets

SYSTEM AND METHOD FOR AUTOMATED ESTABLISHMENT OF A VEHICLE CONSIST

CROSS-REFERENCE TO RELATED APPLICATIONS

This application is a continuation-in-part of U.S. patent application Ser. No. 11/552,602, which was filed on 25 Oct. 2006 now U.S. Pat. No. 8,280,566, and is entitled "Method, System, And Computer Software Code For Automated Establishment Of A Distributed Power Train" (the "'602 application"). The '602 application claims priority to U.S. Provisional Application No. 60/792,428, which was filed on 17 Apr. 2006 (the "'428 application"). The entire disclosures of the '602 application and the '428 application are incorporated by reference into this application.

TECHNICAL FIELD

Embodiments of the subject matter described herein relate to operations of a vehicle system. Other embodiments relate to establishing distributed power operations of a vehicle consist.

BACKGROUND

Trains with distributed power systems can be operated in different modes. One mode is where all locomotives in the train operate at the same notch command. For example, if a lead locomotive is commanding motoring at notch 8 ("N8"), all units in the train will be commanded to generate motoring at N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives.

When operating in distributed power, an operator, usually located in the lead locomotive, can control operating functions of remote locomotives in the remote consists via a control system, such as a distributed power control element. Thus, when operating in distributed power, the operator can command each locomotive consist to operate at a different notch power level (or one consist could be in motoring and other could be in braking), or each individual locomotive in the locomotive consist operates at the same notch power.

Currently, a train having locomotives that may operate in distributed power are set up manually, usually at a rail yard. Operators must physically enter each locomotive to enter data into the distributed power system aboard the locomotive to enable "linking" of the locomotives so that distributed power operations may commence. For example, suppose locomotives are included in a train where the locomotives may be facing different directions, meaning that some may be facing forward whereas others may be facing backward. The operator must physically enter each locomotive and select the direction the locomotive should motor. The operator must also initiate and attempt to complete the linking process prior to any unforeseen problems with equipment or systems in the train being detected. Train operators and owners may realize a financial savings and reduction in manpower from remotely setting up, linking, and testing distributed power operations of a train.

Additionally, if the lead locomotive experiences one or more faults (e.g., in communication with the other locomotives that are linked with the lead locomotive in a distributed power arrangement), the lead locomotive may need to be decoupled from the train and replaced with another lead locomotive. In order to do this, the replacement lead locomotive is coupled to the train and an operator may need to manually enter each remote locomotive along the length of the train to manually input the change in lead locomotive into control systems of the remote locomotives so that these control systems know to receive commands from the replacement lead locomotive, and not the previous lead locomotive that has been removed. For relatively long trains and/or trains having several remote locomotives, this process can consume a significant amount of time.

BRIEF DESCRIPTION

Embodiments of the inventive subject matter are directed toward a system, method, and a computer software code for remotely establishing distributed power operations of a vehicle consist, such as a train. For example, one embodiment relates to a system for establishing distributed power operations of a vehicle consist (e.g., such as, but not limited to, a locomotive consist) from a single location in the vehicle consist. The vehicle consist may have a lead propulsion unit (e.g., such as, but not limited to, a locomotive) and/or a remote propulsion unit, with a distributed power system on each propulsion unit. The system includes a communication network providing communications within the vehicle consist, and at least one distributed power setup unit in communication with the propulsion units by way of the communication network. The distributed power setup unit has a processor, display, and/or an input device to allow a user to establish distributed power operations, or it may work autonomously. In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit is configured to allow the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit allows the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

In another embodiment, a system (e.g., for controllably linking propulsion units) includes a control unit having a first communication interface and a first setup unit operably coupled with the first communication interface. The control unit is configured to be disposed onboard a first propulsion unit of a vehicle consist. The control unit is configured to operate in at least a first mode of operation, a different, second mode of operation, and a different, third mode of operation. When in the first mode of operation, the control unit is configured to transmit a first linking signal to a second propulsion unit in the vehicle consist. The first linking signal includes a first identity of the first propulsion unit for the first propulsion unit to control the second propulsion unit if the first identity corresponds to a first designated identity that is stored onboard the second propulsion unit. When in the second mode of operation, the control unit is configured to transmit a first de-linking signal to the second propulsion unit when the first propulsion unit is to be mechanically decoupled from the vehicle consist. The first de-linking signal includes a first replacement identity of a third propulsion unit that is to be mechanically coupled to the vehicle consist to replace the first propulsion unit, for the third propulsion unit to control the second propulsion unit if a second identity received by the second propulsion unit from the third propulsion unit in a second linking signal matches the first replacement identity. When in the third mode of operation, the control unit is configured to receive a third linking signal from the second propulsion unit, a second de-linking signal from the second propulsion unit, or a fourth linking signal from the third propulsion unit. When in the third mode of operation, the control unit also is configured to allow the second propulsion unit to control the first propulsion unit if a third identity in the third linking signal corresponds to a second designated identity stored onboard the first propulsion unit, or to allow the third propulsion unit to control the first propulsion unit if a fourth identity in the fourth linking signal corresponds to a second replacement identity received in the second de-linking signal from the second propulsion unit.

BRIEF DESCRIPTION OF THE DRAWINGS

A more particular description of embodiments of the inventive subject matter briefly described above will be rendered by reference to specific embodiments thereof that are illustrated in the appended drawings. Understanding that these drawings depict only typical embodiments of the inventive subject matter and are not therefore to be considered to be limiting of its scope, embodiments of the inventive subject matter will be described and explained with additional specificity and detail through the use of the accompanying drawings in which.

DETAILED DESCRIPTION

Figure 1:
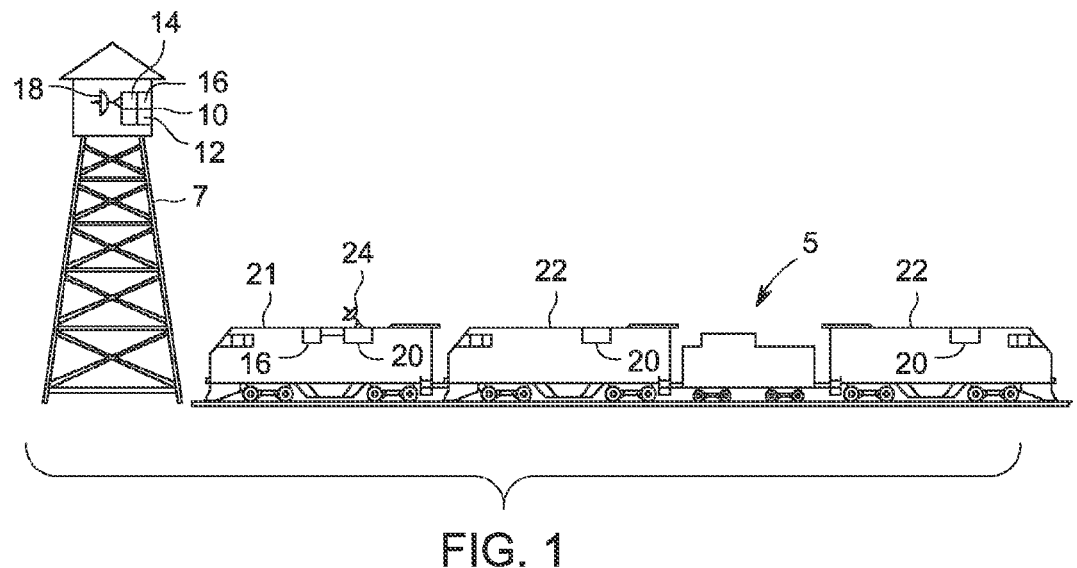
FIG. 1 depicts an embodiment of a system for remotely setting up, linking, and testing distributed power operations of a vehicle system, such as a vehicle consist.

Reference will now be made in detail to embodiments of the inventive subject matter, examples of which are illustrated in the accompanying drawings. Wherever possible, the same reference numerals used throughout the drawings refer to the same or like parts.

Embodiments of the inventive subject matter solve at least some of the problems in the art by providing a system, method, and computer software code for determining and implementing an automated set-up of a vehicle system, such as a distributed power train or other vehicle consist. An apparatus, such as a data processing system, including a CPU, memory, I/O, program storage, a connecting bus, and other appropriate components, could be programmed or otherwise designed to facilitate the practice of the method of the inventive subject matter. Such a system would include appropriate program for executing the method of the inventive subject matter.

Also, an article of manufacture, such as a pre-recorded disk or other similar computer program product for use with a data processing system, could include a storage medium (e.g., a tangible and non-transitory computer readable storage medium) and program (e.g., one or more sets of instructions for directing a processor to perform one or more operations) recorded thereon for directing the data processing system to facilitate the practice of a method of the inventive subject matter. Such apparatus and articles of manufacture also fall within the spirit and scope of the embodiments of the inventive subject matter.

Broadly speaking, at least one technical effect of the inventive subject matter provides for a method, system, and computer software code for automated set-up of a vehicle system, such as a distributed power train or other vehicle consist. To facilitate an understanding of the embodiments of the inventive subject matter, it is described hereinafter with reference to specific implementations thereof. Embodiments of the invention may use program modules that may include routines, programs, objects, components, data structures, etc. that perform particular tasks or implement particular abstract data types. For example, the software programs that underlie embodiments of the inventive subject matter may be coded in different languages for use with different platforms.

Though one or more embodiments of the inventive subject matter are disclosed below as operating with hand-held devices, other embodiments may be practiced with other computer system configurations, including multiprocessor systems, microprocessor-based or programmable consumer electronics, minicomputers, mainframe computers, and the like. Embodiments of the inventive subject matter may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

Throughout this document the term vehicle consist is used. A vehicle consist is a group of two or more vehicles that are mechanically coupled to travel together along a route. A vehicle consist may have one or more propulsion-generating units (e.g., vehicles capable of generating propulsive force, which also are referred to as propulsion units) in succession and connected together so as to provide motoring and/or braking capability for the vehicle consist. The propulsion units may be connected together with no other vehicles or cars between the propulsion units. One example of a vehicle consist is a locomotive consist that includes locomotives as the propulsion units. Other vehicles may be used instead of or in addition to locomotives to form the vehicle consist. A vehicle consist can also include non-propulsion units, such as where two or more propulsion units are connected with each other by a non-propulsion unit, such as a rail car, passenger car, or other vehicle that cannot generate propulsive force to propel the vehicle consist. A larger vehicle consist, such as a train, can have sub-consists. Specifically, there can be a lead consist (of propulsion units), and one or more remote consists (of propulsion units), such as midway in a line of cars and another remote consist at the end of the train. The vehicle consist may have a lead propulsion unit and a trail or remote propulsion unit. The terms "lead," "trail," and "remote" are used to indicate which of the propulsion units control operations of other propulsion units, and which propulsion units are controlled by other propulsion units, regardless of locations within the vehicle consist. For example, a lead propulsion unit can control the operations of the trail or remote propulsion units, even though the lead propulsion unit may or may not be disposed at a front or leading end of the vehicle consist along a direction of travel. A vehicle consist can be configured for distributed power operation, wherein throttle and braking commands are relayed from the lead propulsion unit to the remote propulsion units by a radio link or physical cable. Toward this end, the term vehicle consist should be not be considered a limiting factor when discussing multiple propulsion units within the same vehicle consist.

Referring now to the drawings, embodiments of the inventive subject matter will be described. FIG. 1 depicts an embodiment of a system for remotely setting up, linking, and testing operations of a vehicle consist. In one embodiment, the system may set up, link, and/or test distributed power operations of a vehicle consist such as a train. At a location, or remote location, such as away from a vehicle consist 5, such as in a tower 7, a setup unit 10 is provided for an operator to use. The setup unit 10 can be a unit that sets up the vehicle consist 5 for distributed power operations or for other operations. In another embodiment, an operator aboard a vehicle consist, such as located in a lead propulsion unit 21 of the vehicle consist 5, may use the setup unit 10 to remotely setup remote propulsion units 22 in the vehicle consist 5 for operations, such as distributed power operations. While the propulsion units 21, 22 may be referred to as lead and remote locomotives, respectively, alternatively the units 21, 22 may represent other vehicles capable of generating propulsive force to propel the vehicle consist 5.

Figure 2:
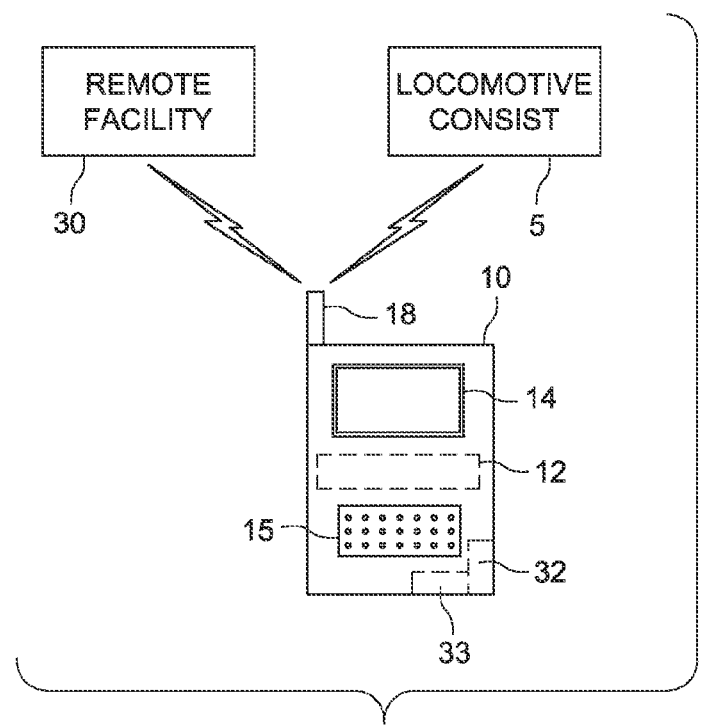
FIG. 2 depicts an embodiment of a setup unit.

FIG. 2 depicts an embodiment of a setup unit. The setup unit 10 has a computer, or processor, 12 with a display 14 and operator input device 15, such as but not limited to a mouse and/or a keyboard. As disclosed herein, the setup unit 10 may be a hand-held device. A first communication interface 18 is also connected to the setup unit 10. As further illustrated in FIG. 1, the first communication interface 18 is able to communicate with a distributed power system 20 on the propulsion units 21, 22.

At the vehicle consist 5, a second communication interface 24 is provided to receive and send communications between itself and the first communication interface 18 at the setup unit 10. The first communication interface 18 at the setup unit 10 is in communication with the distributed power system 20 so that the setup unit 10 can receive information from the distributed power system 20 and send commands to the distributed power system 20. Examples of the distributed power system include, but are not limited to Assignee's LOCOTROL® Locomotive System Integration (LSI) Electronics, or System, and/or other systems/equipment that functions with the LSI system.

In an example use of the inventive subject matter, an operator may use the setup unit 10 to input such information as, but not limited to, road numbers of the lead propulsion unit 21 and all remote propulsion units 22 within the vehicle consist 5 to be linked (or other identifying information), the orientation of each propulsion unit 21, 22 within the vehicle consist 5 (e.g., whether the short hood or long hood of the respective propulsion unit 21, 22 is forward), and the like. By doing so, the propulsion units will know which direction is forward since each of the propulsion units 21, 22 may have either its respective short hood or long hood facing the direction that the vehicle consist 5 will move.

The setup unit 10 may transmit this information to each distributed power generating unit 21, 22 in the vehicle consist 5, or to the lead propulsion unit 21, which in turn can communicate with the remote propulsion units 22. In one embodiment, the on-board distributed system 20 only accepts such data when the propulsion units 21, 22 are not already linked. In another embodiment, the operator may override a prior link of the propulsion units 21, 22 with new information.

The on-board distributed system 20 may accept the data and proceed with linking the propulsion units 21, 22. The linking process could continue through completion of a test that confirms proper linking of the locomotives. The complete linking process could be completed without human intervention aboard any of the propulsion units 21, 22 and prior to operators physically entering the vehicle consist 5.

For example, with the LOCOTROL® LSI system, in an embodiment, information that may be provided on a display of the LSI system is also provided on a display on the setup unit 10. Based on how the LSI system functions, the remote propulsion units 21, 22 in a vehicle consist 5 are set up first. The lead propulsion unit 21 of the vehicle consist 5 is only set after all setups for the remote propulsion units 22 are completed. The distributed power operations can also be shutdown using an embodiment of the inventive subject matter. As discussed in more detail below with respect to FIG. 3, the lead propulsion unit 21 may report a status back to the setup unit 10, either confirming the linking process was successful or reporting a failure and identifying what step in the process detected the failure along with any information, or data, as to what could have caused the failure.

As further illustrated in FIG. 2, the setup unit may be accessible by other remote locations 30, such as a dispatch location and/or a repair depot. This remote location will know when the vehicle consist 5 is properly linked. If the linking process is not completed due to a failure, this information can also be forwarded.

In an embodiment, connections between the setup unit 10 and the distributed power system 20 may be via radio and/or any other form of wireless communication. In another embodiment, communication may take place via a wired connection. Communications between the setup unit 10 and the remote facility 7 may be via wireless communications and/or wired communications. For example, communications may occur using the Internet where dial-in-connections, cable modems, special high-speed IDSN lines, networks such as local area networks, wide area networks, etc. may be utilized. Furthermore when the setup unit 10 is used aboard the vehicle consist 5, such aboard the lead propulsion unit 21, the unit 10 may be directly interfaced into the distributed power system 20 aboard the lead propulsion unit 21.

In addition to the parts of the setup unit 10 disclosed above, the setup unit 10 may also have a mass storage device 32 and memory 33. The setup unit 10 may store information regarding linking processes that are completed so that data about prior linking processes may be later communicated to a remote facility.

Figure 3:
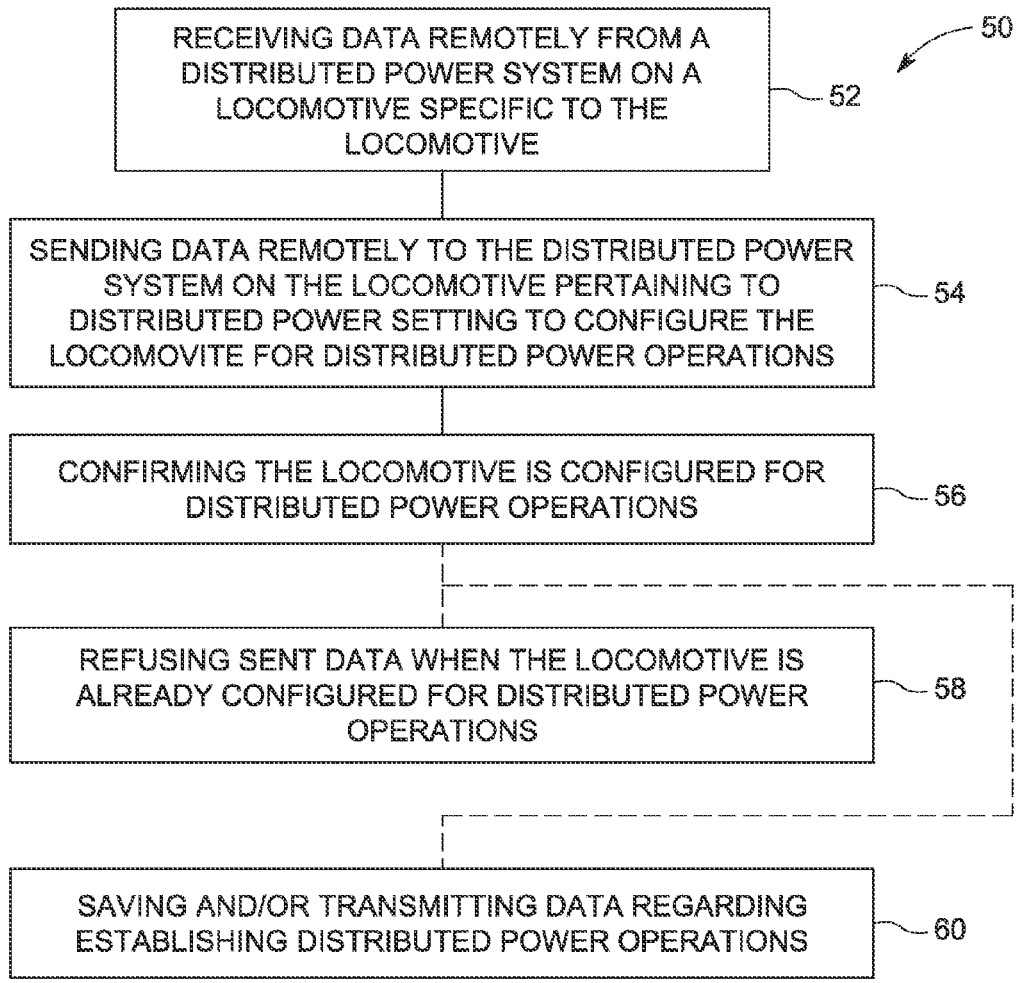
FIG. 3 depicts an embodiment of a flowchart of a method for remotely setting up, linking and testing distributed power operations of a vehicle consist.

FIG. 3 depicts a flowchart of a method for remotely setting up, linking, and testing operations of a vehicle consist. As discussed above and illustrated in the flowchart 50, the method includes receiving data remotely from a distributed power system on a propulsion unit, at 52. This data may be specific to the propulsion unit that receives the data. The data is sent remotely to the distributed power system on the propulsion unit pertaining to distributed power settings in order to configure the propulsion unit for distributed power operations, at 54. A confirmation is made as to whether the propulsion unit is configured for distributed power operations, at 56. As discussed above, if the propulsion unit 21, 22 is already configured for distributed power operations, the method may refuse the sent data, at 58. Additionally, data may be saved and/or transmitted regarding the establishment, or inability to establish, distributed power operations, at 60. As discussed above, the data may be sent back to the setup unit 10. If a failure occurs the data may include, but is not limited to, what step in the process detected the failure including data as to what could have caused the failure.

Figure 4:
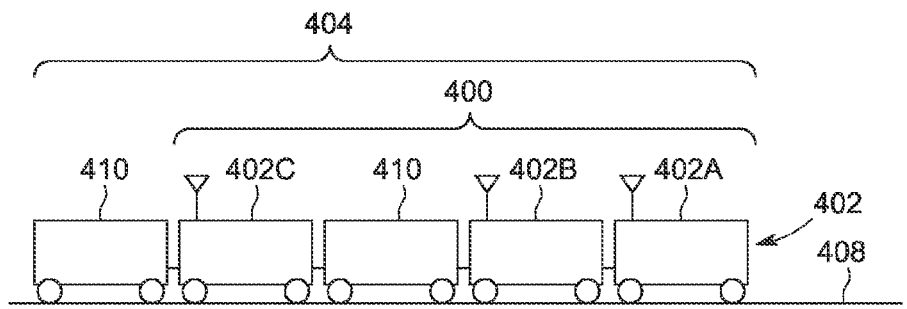
FIG. 4 is a schematic illustration of another embodiment of a communication system for controllably linking propulsion units in a vehicle consist.

FIG. 4 is a schematic illustration of another embodiment of a system 400 (e.g., a communication system) for controllably linking propulsion units 402 in a vehicle consist 404. The vehicle consist 404 includes one or more propulsion units 402 (e.g., vehicles that generate propulsive force to propel the vehicle consist 404). In the illustrated embodiment, the vehicle consist 404 includes three propulsion units 402A, 402B, 402C, but alternatively may include two propulsion units 402 or more than three propulsion units 402. The vehicle consist 404 is shown as a train, but alternatively may represent another system of vehicles that are connected with each other to travel together along a route 408, such as a track, road, waterway, and the like. The propulsion units 402 may represent rail vehicles that are powered to propel the vehicle consist 404, such as propulsion units. Alternatively, the propulsion units 402 may represent other vehicles that generate propulsive force, such as other rail vehicles, other off-highway vehicles, automobiles, marine vessels, and the like. The vehicle consist 404 includes several non-propulsion units 410, such as vehicles that do not generate propulsive force to propel the vehicle consist 404. Examples of such non-propulsion units 410 include, but are not limited to, rail cars, passenger cars, and the like.

The communication system 400 allows for the propulsion units 402 of the vehicle consist 404 to be controllably linked with each other. When the propulsion units 402 are controllably linked, at least one of the propulsion units 402 (referred to herein as a lead propulsion unit) can remotely control operations of other propulsion units 402 (referred to herein as trail or remote propulsion units). When the propulsion units 402 are not controllably linked, the lead propulsion unit 402 may not be able to control operations of the remote propulsion units. The communication system 400 is shown as including antennas of the propulsion units 402 that wirelessly communicate with each other, but alternatively or additionally may include one or more wired connections, such as by using communications through one or more cables, buses, trainlines, conductors used for communications with electronically controlled pneumatic (ECP) brakes, conductors used for communications within an electric multiple unit (MU cable), and the like.

The terms "lead" and "remote" are meant to indicate which propulsion units 402 control operations of other propulsion units 402, and does not necessarily indicate relative locations of the propulsion units 402 in the vehicle consist 404. By "remotely" control, it is meant that the operations of the remote propulsion unit 402 are controlled from a location that is outside of the remote propulsion unit 402, although not necessarily far away from the remote propulsion unit 402. In one embodiment, the communication system 400 controllably links the propulsion units 402 in a distributed power system so that the lead propulsion unit 402 remotely controls the tractive efforts (e.g., propulsive forces) generated by the remote propulsion units 402.

The remote propulsion units 402 can prevent a lead propulsion unit 402 from remotely controlling operations of the remote propulsion units 402 unless the lead propulsion unit 402 and the remote propulsion unit 402 are controllably linked with each other. Several remote propulsion units 402 (e.g., propulsion units 402B, 402C) may be controllably linked with a single lead propulsion unit 402 (e.g., propulsion unit 402A). Alternatively, one or more remote propulsion units 402 can be controllably linked with more than one lead propulsion unit 402.

In order to controllably link propulsion units 402 with each other, such as in a distributed power system, a linking process may be performed. The linking process described herein is used to associate (e.g., controllably link) a single lead propulsion unit 402 with a single remote propulsion unit 402. The process may be used, however, to controllably link the lead propulsion unit 402 with several remote propulsion units 402.

Figure 5A:
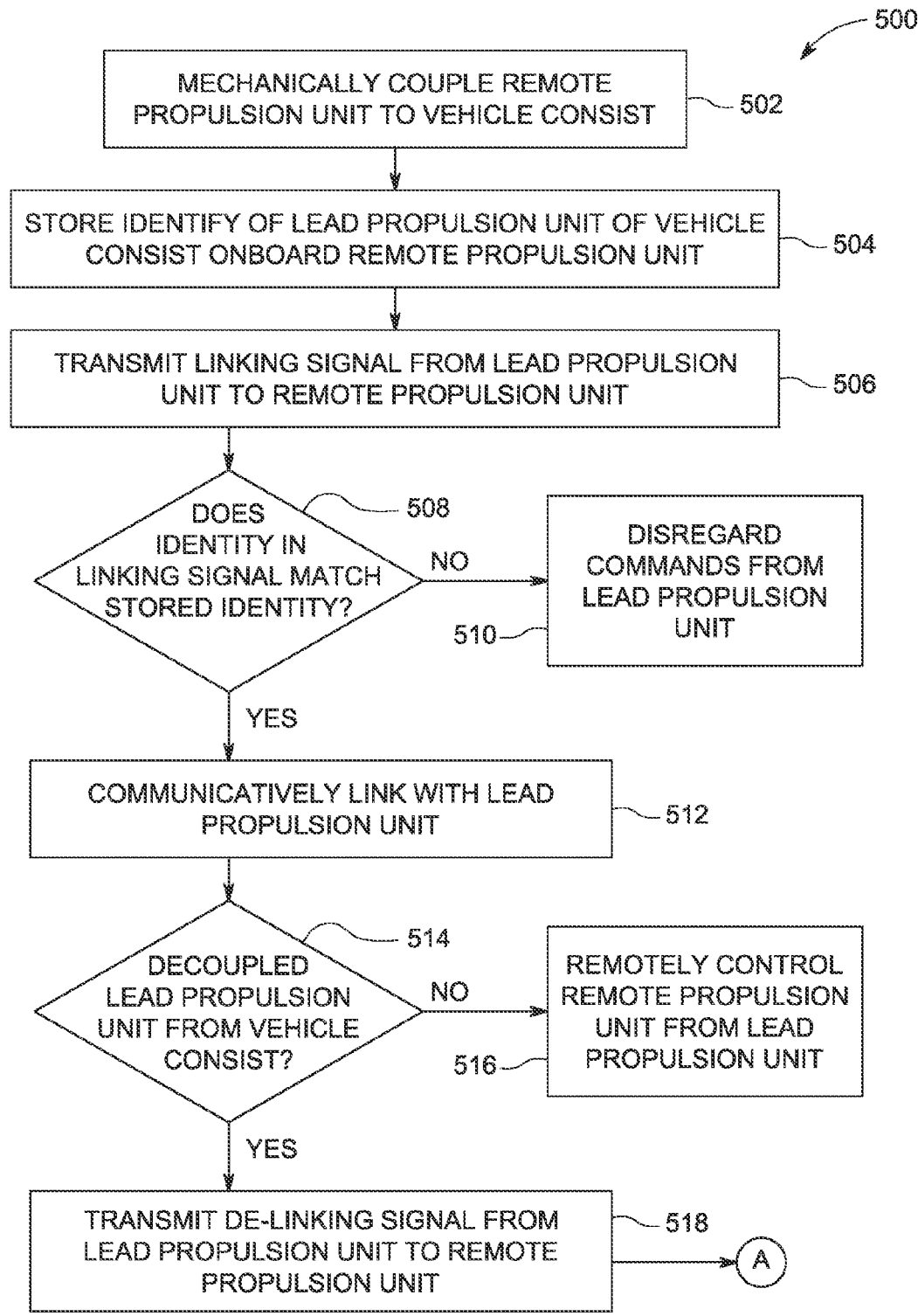
FIGS. 5A and 5B illustrate a flowchart of one embodiment of a method or process for controllably linking propulsion units of a vehicle consist.
Figure 5B:
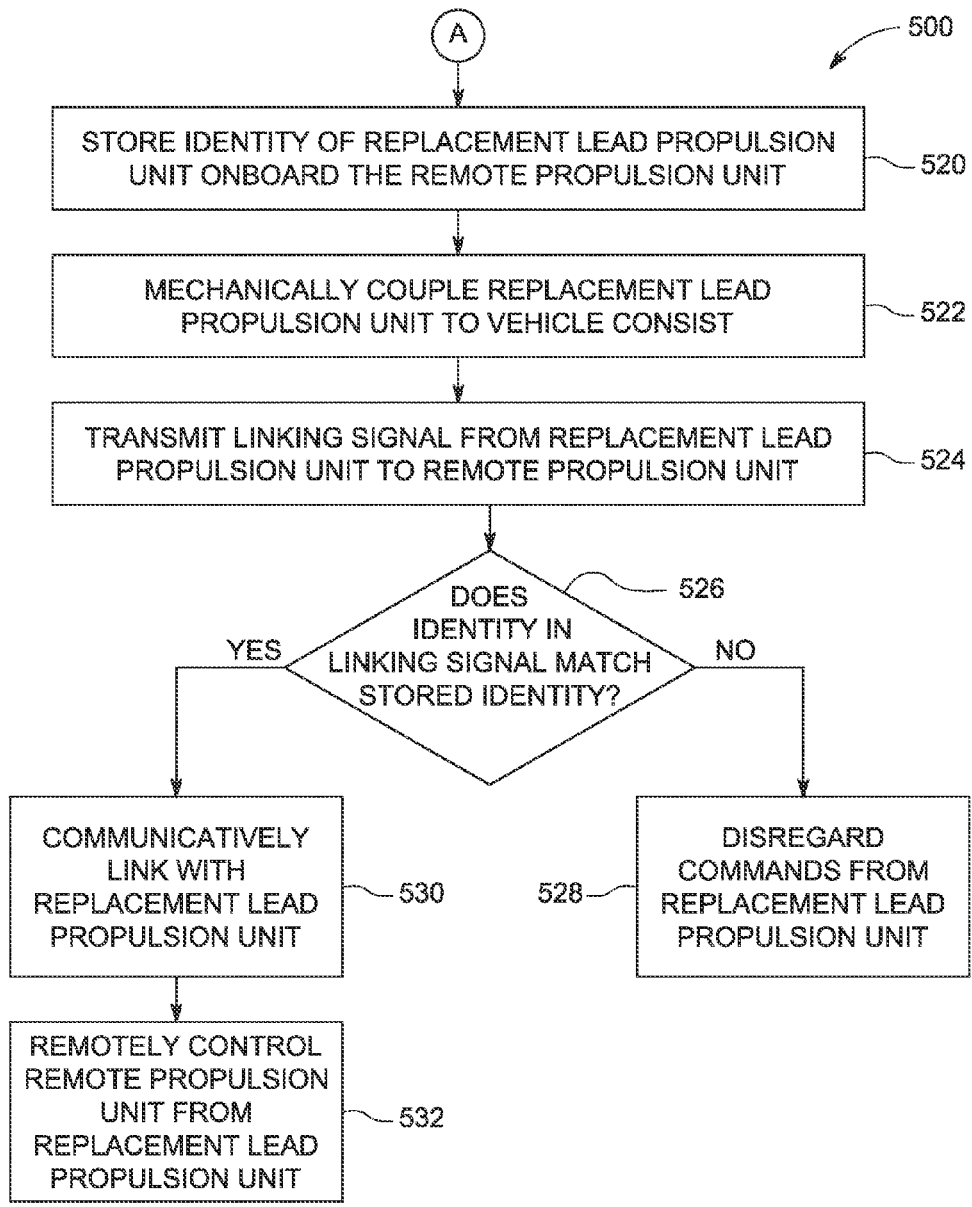

FIGS. 5A and 5B illustrate a flowchart of one embodiment of a method or process 500 for controllably linking propulsion units of a vehicle consist. The method 500 can represent the linking process that is used to controllably link or couple a remote propulsion unit 402 (shown in FIG. 4) with a first lead propulsion unit 402, to communicatively de-couple the remote propulsion unit 402 from the first lead propulsion unit 402, and then to controllably link the remote propulsion unit 402 with another, replacement lead propulsion unit 402. The linking of the remote propulsion unit 402 with the replacement lead propulsion unit 402 can be performed without requiring a human operator to enter into the remote propulsion unit 402 after the remote propulsion unit 402 is first controllably linked with the first lead propulsion unit 402.

At 502, a remote propulsion unit 402B (shown in FIG. 4) is mechanically coupled with the vehicle consist 404 (shown in FIG. 4). The remote propulsion unit 402B can be sequentially coupled with other propulsion units 402 and/or non-propulsion units 410 (shown in FIG. 4).

At 504, an identity of the first lead propulsion unit 402A is provided to the remote propulsion unit 402B. For example, an operator may enter into the remote propulsion unit 402B and manually input the identity of the first lead propulsion unit 402A into a setup unit of the remote propulsion unit 402B. The propulsion units 402 may be associated with unique identities that allow the remote propulsion unit 402B to differentiate between the different propulsion units 402. These identities may be alphanumeric strings, numeric strings, letter strings, or the like. The identity of the lead propulsion unit 402A that is provided to the remote propulsion unit 402B is referred to herein as a designated identity, as the identity may be designated by a person, component, device, or system other than the lead propulsion unit 402A.

At 506, a linking signal is transmitted from the lead propulsion unit 402A to the remote propulsion units 402. For example, a communication interface of the lead propulsion unit 402A may transmit or broadcast signals to the remote propulsion units 402 of the vehicle consist 404. The linking signal includes an identity of the lead propulsion unit 402A that transmitted the linking signal. A communication interface onboard the remote propulsion unit 402B may receive the linking signal and extract the identity of the lead propulsion unit 402A from the linking signal.

At 508, a determination is made as to whether the identity that is included in the received linking signal corresponds to the designated identity that is locally stored at the remote propulsion unit 402B. For example, a setup unit onboard the remote propulsion unit 402B can compare the identity in the received linking signal with the locally stored designated identity to see if the identities both represent the same lead propulsion unit 402A. If the identity input at the remote propulsion unit 402B and the identity communicated in the received linking signal do not both represent the same lead propulsion unit 402A, then the remote propulsion unit 402B determines that the linking signal was sent from a propulsion unit 402 that is not the same propulsion unit 402 identified by the identity provided to the remote propulsion unit 402B. As a result, flow of the method 500 proceeds to 510. If both identities represent the same lead propulsion unit 402A, then the remote propulsion unit 402B determines that the linking signal was sent from the lead propulsion unit 402A previously identified by the operator. As a result, flow of the method 500 proceeds to 512.

At 510, the remote propulsion unit 402B does not controllably link with the lead propulsion unit 402A that transmitted the linking signal and command or control signals that are sent by the lead propulsion unit 402A to the remote propulsion unit 402B are ignored by the remote propulsion unit 402B.

At 512, the remote propulsion unit 402B is controllably linked with the lead propulsion unit 402A. For example, once a setup unit onboard the remote propulsion unit 402B confirms that the lead propulsion unit 402A is identified by both the designated identity stored onboard the remote propulsion unit 402B and the identity sent in the linking signal, then the setup unit may controllably link with the lead propulsion unit 402A. The lead propulsion unit 402A may then remotely control operations of the remote propulsion unit 402B.

At 514, a determination is made as to whether the lead propulsion unit 402A is to be removed from the vehicle consist 404 or remain in the vehicle consist 404. For example, one or more faults may occur during operation of the lead propulsion unit 402A, such as faults in the communication interface of the lead propulsion unit 402A. As a result, the lead propulsion unit 402A may be unable to remotely control the remote propulsion units 402. If the lead propulsion unit 402A does not need to be decoupled from the vehicle consist 404 and replaced with another lead propulsion unit 402, flow of the method 500 may proceed to 516. If the lead propulsion unit 402A does need to be decoupled from the vehicle consist 404 and replaced, then flow of the method 500 can continue to 518.

At 516, the lead propulsion unit 402A remotely controls operations of the remote propulsion unit 402B during movement of the vehicle consist 404 along the route 408 (shown in FIG. 4). For example, the lead propulsion unit 402A can direct the tractive efforts, braking efforts, and the like, that are provided by the remote propulsion unit 402B during travel of the vehicle consist 404.

At 518, the lead propulsion unit 402A is to be removed from the vehicle consist 404 and, as a result, transmits a de-linking signal to the remote propulsion unit 402B. The de-linking signal may be transmitted before or after the lead propulsion unit 402A is removed from the vehicle consist 404. The de-linking signal notifies the remote propulsion unit 402B that the lead propulsion unit 402A is being removed and replaced by another, replacement propulsion unit 402.

Figure 6:
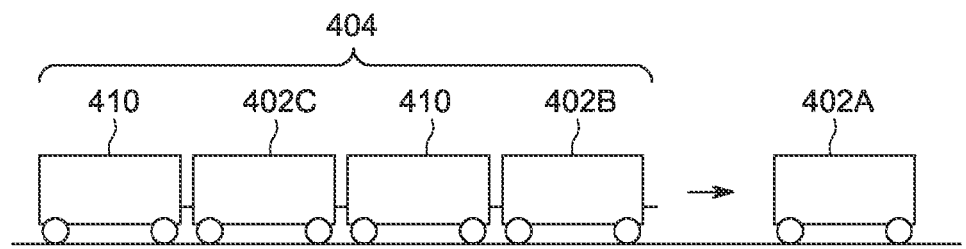
FIG. 6 schematically illustrates removal of a lead propulsion unit from the vehicle system shown in FIG. 4 in accordance with one embodiment.
Figure 7:
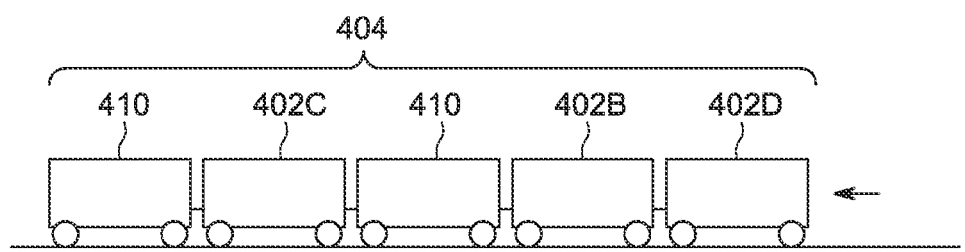
FIG. 7 schematically illustrates coupling of a replacement lead propulsion unit with the vehicle consist shown in FIG. 4 in accordance with one embodiment.

FIG. 6 schematically illustrates removal of the lead propulsion unit 402A from the vehicle consist 404 in accordance with one embodiment. The lead propulsion unit 402A can be mechanically de-coupled from the vehicle consist 404 and moved away from the vehicle consist 404. FIG. 7 schematically illustrates coupling of a replacement lead propulsion unit 402D with the vehicle consist 404 in accordance with one embodiment. The replacement lead propulsion unit 402D can be mechanically coupled with the vehicle consist 404 after the lead propulsion unit 402A is removed from the vehicle consist 404.

Returning to the discussion of the method 500 shown in FIGS. 5A and 5B, the de-linking signal also can include an identity of the replacement lead propulsion unit 402D (referred to herein as a replacement identity). An operator may input the replacement identity into a setup unit onboard the lead propulsion unit 402A. Alternatively, the replacement identity may be communicated to the lead propulsion unit 402A from a remote location.

At 520 (shown in FIG. 5B), the identity of the replacement lead propulsion unit 402D is stored onboard the remote propulsion unit 402B. For example, the setup unit disposed onboard the remote propulsion unit 402B can locally store the replacement identity in an onboard memory.

At 522, the replacement lead propulsion unit 402D is mechanically coupled with the vehicle consist 404, as shown in FIG. 7. At 524, a linking signal (also referred to herein as a replacement linking signal) is transmitted from the replacement lead propulsion unit 402D to the remote propulsion unit 402B. Similar to the linking signal transmitted by the previous lead propulsion unit 402A, the replacement linking signal may include the identity of the replacement propulsion unit 402D.

At 526, a determination is made as to whether the identity that is included in the replacement linking signal corresponds to the replacement identity that is locally stored at the remote propulsion unit 402B. For example, the setup unit onboard the remote propulsion unit 402B can compare the identity in the received replacement linking signal with the locally stored replacement identity to see if the identities both represent the same replacement lead propulsion unit 402D. If the identities do not both represent the same replacement lead propulsion unit 402D, then the remote propulsion unit 402B determines that the replacement linking signal was sent from a propulsion unit 402 that is not the same propulsion unit 402 identified by the replacement identity provided to the remote propulsion unit 402B in the de-linking signal sent by the previous lead propulsion unit 402A. As a result, flow of the method 500 proceeds to 528.

If both identities represent the same replacement lead propulsion unit 402D, then the remote propulsion unit 402B determines that the replacement linking signal was sent from the same replacement lead propulsion unit 402D previously identified by the de-linking signal from the previous lead propulsion unit 402A. As a result, flow of the method 500 proceeds to 530.

At 528, the remote propulsion unit 402B does not controllably link with the replacement lead propulsion unit 402D that transmitted the replacement linking signal. Consequently, command or control signals that are sent by the replacement lead propulsion unit 402D to the remote propulsion unit 402B are ignored by the remote propulsion unit 402B.

At 530, the remote propulsion unit 402B is controllably linked with the replacement lead propulsion unit 402D. For example, once a setup unit onboard the remote propulsion unit 402B confirms that the replacement lead propulsion unit 402D is identified by both the replacement identity stored onboard the remote propulsion unit 402B and the identity sent in the replacement linking signal, then the setup unit may controllably link with the replacement lead propulsion unit 402D.

At 532, the replacement lead propulsion unit 402D remotely controls operations of the remote propulsion unit 402B. For example, the replacement lead propulsion unit 402D can direct the tractive efforts, braking efforts, and the like, that are provided by the remote propulsion unit 402B during travel of the vehicle consist 404.

Figure 8:
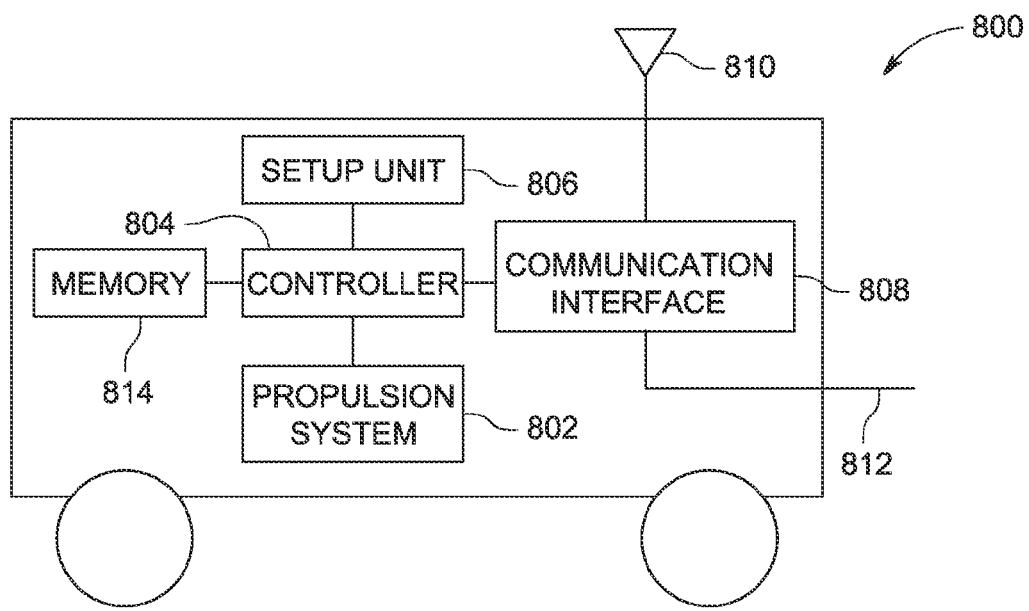
FIG. 8 is a schematic illustration of one embodiment of a propulsion unit.

FIG. 8 is a schematic illustration of one embodiment of a propulsion unit 800. The propulsion unit 800 may represent one or more of the propulsion units 402 shown in FIGS. 4, 6, and 7. For example, the propulsion unit 800 may represent the lead propulsion unit 402A, the remote propulsion unit 402B, and/or the replacement lead propulsion unit 402D.

The propulsion unit 800 includes a propulsion system 802 that generates propulsive force to propel the propulsion unit

800. The propulsion system 802 may include or represent one or more engines, alternators, generators, energy storage devices (e.g., batteries, flywheels, and the like), catenaries, shoes, traction motors, and the like.

The propulsion system 802 is controlled by a controller 804. The controller 804 includes or represents one or more processors, input devices, output devices, and the like, that is used to control operations of the propulsion system 802. The controller 804 may receive input from an operator disposed onboard the propulsion unit 800 to control the propulsion system 802. Alternatively or additionally, the controller 804 may be remotely controlled by another propulsion unit 800. For example, if the controller 804 is disposed onboard a remote propulsion unit that is controllably linked with a lead propulsion unit in a distributed power system, the controller 804 may receive control signals or commands from the lead propulsion unit. The controller 804 may then implement the commands from the lead propulsion unit to control operations of the propulsion system 802.

A setup unit 806 disposed onboard the propulsion unit 800 may be similar to the setup unit 10 shown in FIG. 2. As described above, the setup unit 806 can include or represent a processor, output device (e.g., a display), and an input device. The setup unit 806 can be a portable, hand-held device that is capable of being moved by an average human being within the propulsion unit 800 and/or outside of the propulsion unit 800 without mechanical assistance to lift and carry the setup unit 806. Alternatively, the setup unit 806 may be fixed within the propulsion unit 800, such as by being mounted to a surface within the propulsion unit 800.

The setup unit 806 is operably connected with a communication interface 808, which may be similar to the communication interface 18 shown in FIG. 2. The communication interface 808 can include circuitry and associated hardware and/or software for allowing the propulsion unit 800 to communicate with one or more other propulsion units 800 or other locations. The communication interface 808 includes an antenna 810 that wirelessly communicates with other propulsion units 800. Additionally or alternatively, the communication interface 808 can be connected with a conductive pathway 812 that is joined with the communication interface 808 of another propulsion unit 800. The communication interfaces 808 can communicate with each other over this conductive pathway 812. The conductive pathway 812 can represent one or more cables, buses, and the like, such as an ECP line, a trainline, an eMU line, or the like.

A memory 814 is disposed onboard the propulsion unit 800 and is accessible to the controller 804, setup unit 806, and/or communication interface 808. The memory 814 can represent a tangible and non-transitory computer readable storage medium, such as a computer hard drive or other volatile or non-volatile memory. The memory 814 can store one or more sets of instructions (e.g., software) that directs the setup unit 806 and/or controller 804 to perform one or more operations. As described herein, the memory 814 can be used to store identities of propulsion units 800. For example, where the propulsion unit 800 represents a remote propulsion unit 800 (e.g., the remote propulsion unit 402B in FIG. 4), the setup unit 806 can be used to receive an operator-designated identity of a first lead propulsion unit and to store the designated identity in the memory 814. The setup unit 806 can then compare the designated identity in the memory 814 with an identity that is received by the communication interface 806 via a linking signal, as described above. When a replacement identity is received by the communication interface 806, the setup unit 806 can store the replacement identity in the memory 814, also as described above.

In one embodiment, the propulsion units described herein may be interchangeable in that one or more propulsion units may be capable of operating as lead propulsion units and remote propulsion units. For example, a first propulsion unit may operate as a lead propulsion unit in a vehicle consist to control operations of other propulsion units in the vehicle consist during a first time period. During a different, second time period (e.g., during the same or different trip of the vehicle consist), the first propulsion unit may operate as a remote propulsion unit so that operations of the first propulsion unit are controlled by another propulsion unit in the vehicle consist.

Figure 9:
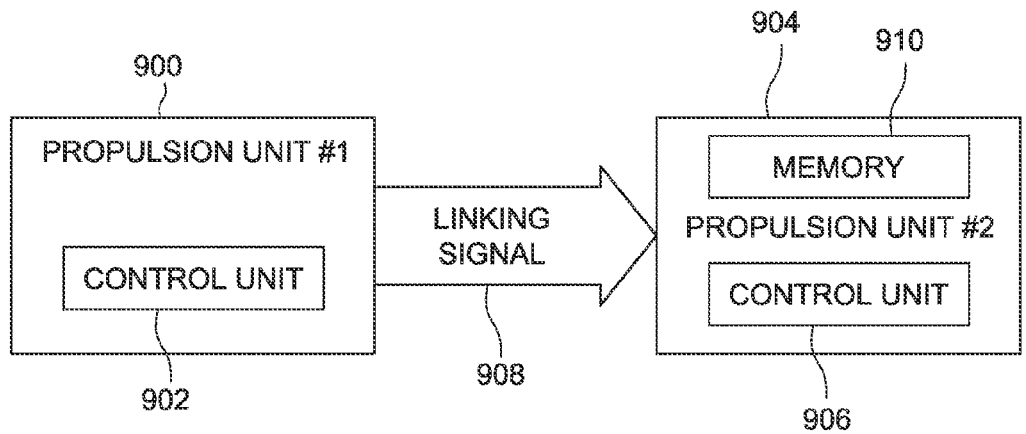
FIG. 9 illustrates one embodiment of a control unit of a propulsion unit operating in a first mode of operation.
Figure 10:
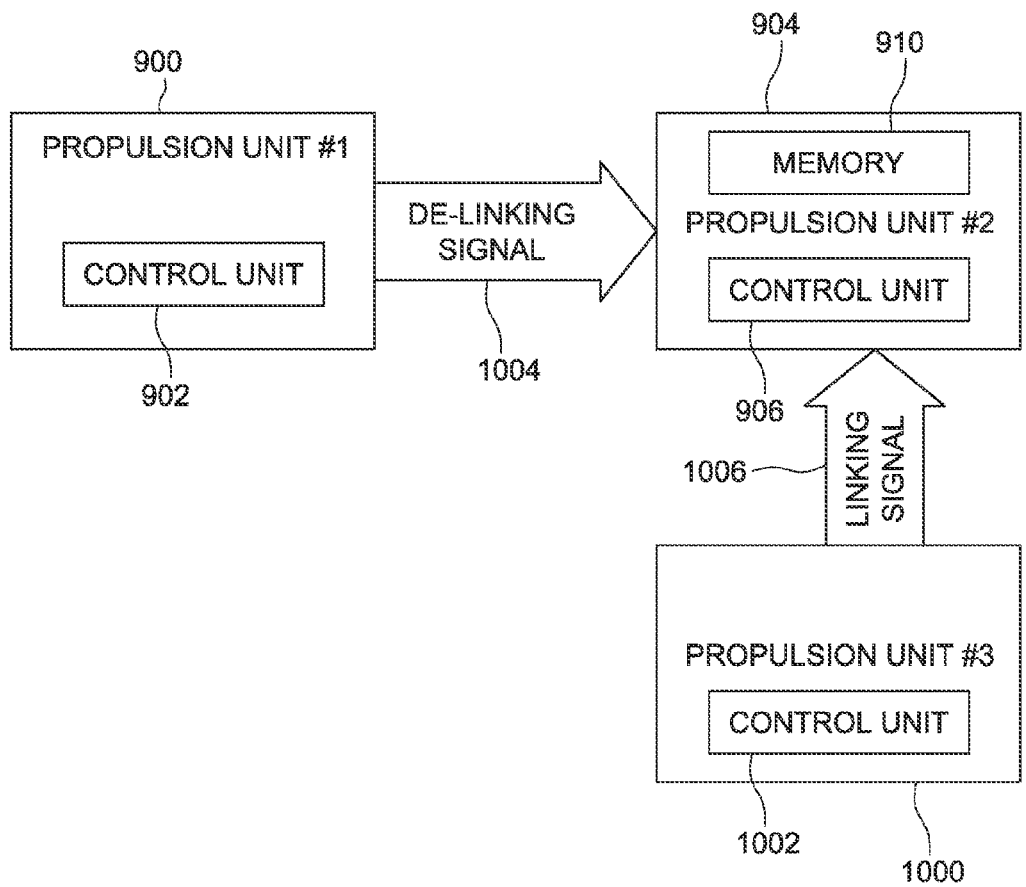
FIG. 10 illustrates one embodiment of the control unit of the propulsion unit shown in FIG. 9 operating in a different, second mode of operation.
Figure 11:
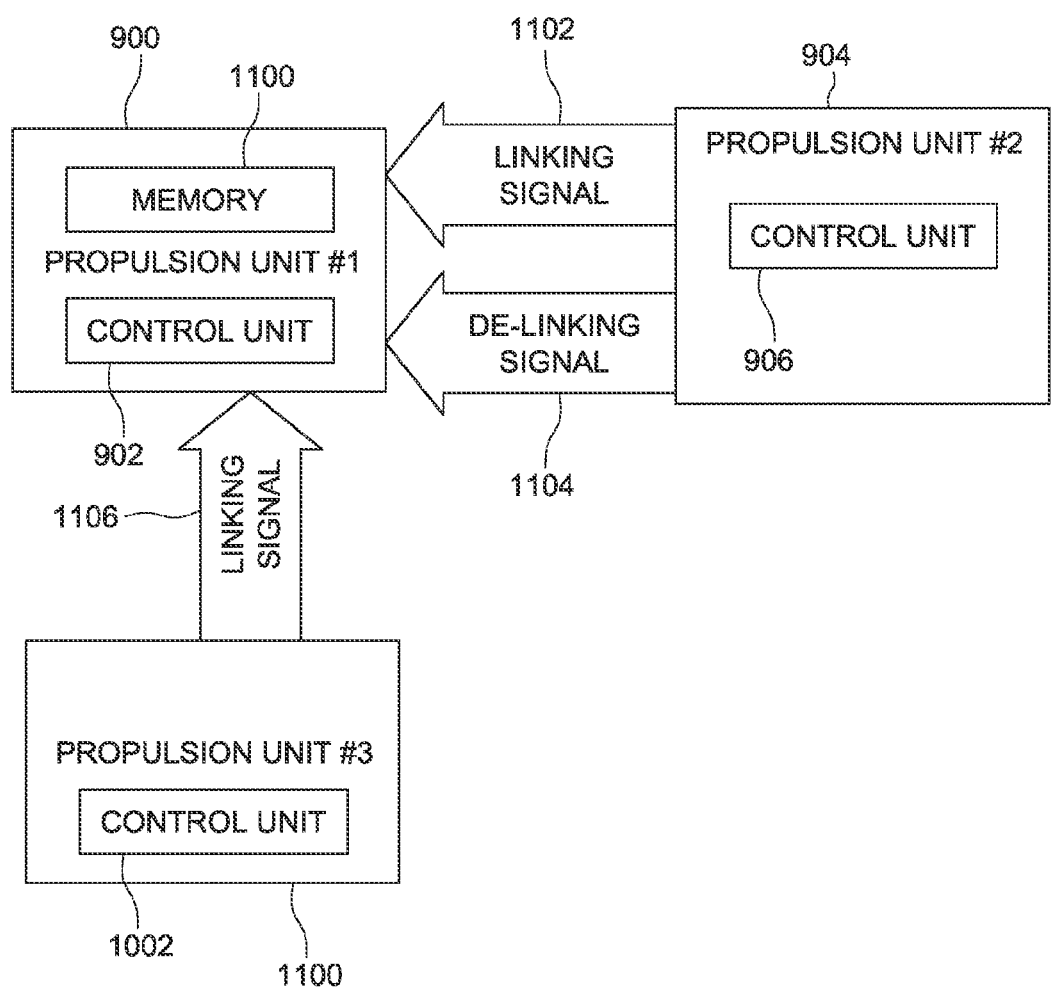
FIG. 11 illustrates one embodiment of the control unit of the first propulsion unit shown in FIG. 9 operating in a different, third mode of operation.

FIGS. 9 through 11 illustrate schematic diagrams of one embodiment of a first propulsion unit 900 (e.g., "Propulsion Unit #1") operating in different modes. The first propulsion unit 900 may represent one or more of the propulsion units described herein. The first propulsion unit 900 includes a control unit 902, which may represent the setup unit 806, controller 804, and/or communication interface 806 (shown in FIG. 8). The first propulsion unit 900 also can include a memory 1100 (shown in FIG. 11) similar to the memory 814 (shown in FIG. 8). Also shown in FIGS. 9 through 11 are second and third propulsion units 904, 1000 (e.g., "Propulsion Unit #2" and "Propulsion Unit #3," respectively), which may represent one or more of the propulsion units described herein. The second and third propulsion units 904, 1000 also can include control units 906, 1002 and/or memories 910, similar to the first propulsion unit 900. In one embodiment, the control units 902, 906, 1002 of the first, second, and third propulsion unit 900, 904, 1000 may interchangeably switch between operating modes to switch which of the propulsion units 900, 904, 1000 operate as a lead propulsion unit (e.g., that remotely controls operations of other propulsion units in a vehicle consist) and which of the propulsion units 900, 904, 1000 operate as a remote propulsion unit. While the discussion herein focuses on the control unit 902 of the first propulsion unit 900 switching between different operations modes, the discussion also may apply to the control units 906 and/or 1002 of the second and/or third propulsion units 904, 1000.

FIG. 9 illustrates the control unit 902 of the first propulsion unit 900 operating in a first mode of operation where the first propulsion unit 900 is to controllably link with the second propulsion unit 904 to control operations of the second propulsion unit 904. As described above, the control unit 902 transmits a first linking signal 908 to the control unit 906 of the second propulsion unit 904. The first linking signal 908 includes or represents an identity of the control unit 902 of the first propulsion unit 900 (and/or an identity of the first propulsion unit 900). The control unit 906 compares this identity to a designated identity stored in the memory 910 (or received from an operator, received from an off-board location, or the like), as described above. If the received identity of the first linking signal 908 matches the designated identity, then the control unit 902 of the first propulsion unit 900 is controllably linked with the control unit 906 of the second propulsion unit 904 in order to remotely control operations of the second propulsion unit 904.

FIG. 10 illustrates the control unit 902 of the first propulsion unit 900 operating in a different, second mode of operation where the first propulsion unit 900 de-links from the second propulsion unit 904. The control unit 902 transmits a first de-linking signal 1004 to the control unit 906 of the second propulsion unit 904 when the first propulsion unit 900 is to be mechanically decoupled from the vehicle consist that includes the first and second propulsion units 900, 904. The first de-linking signal 1004 includes a first replacement identity of the third propulsion unit 1000 that is to be mechanically coupled to the vehicle consist to replace the first propulsion unit 904. The control unit 1002 of the third propulsion unit 1000 can transmit a second linking signal 1006 to the control unit 906 of the second propulsion unit 1000 that includes or represents an identity of the control unit 1002 (and/or an identity of the third propulsion unit 1000). As described above, the third propulsion unit 1000 can be joined with the vehicle consist to control the second propulsion unit 904 if the first replacement identity that is received in the de-linking signal 1004 matches or otherwise corresponds to the identity that is communicated in the linking signal 1006.

FIG. 11 illustrates the control unit 902 of the first propulsion unit 900 operating in a different, third mode of operation where the first propulsion unit 900 can operate as a remote propulsion unit. Similar to as described above, the control unit 902 of the first propulsion unit 900 can receive a third linking signal 1102 from the control unit 906 of the second propulsion unit 904. The control unit 902 can compare an identity that is communicated in the third linking signal 1102 with a designated identity that is stored in the memory 1100 of the first propulsion unit 900 (or received from an operator, received from an off-board source, or the like). If the identities match, then the control unit 902 may be controllably linked with the control unit 906 of the second propulsion unit 904 such that the control unit 906 of the second propulsion unit 904 remotely controls operations of the first propulsion unit 900.

In the third mode, the control unit 902 of the first propulsion unit 900 can receive a second de-linking signal 1104 from the control unit 906 of the second propulsion unit 904. As described above, the de-linking signal 1104 may be transmitted when the second propulsion unit 904 is to separate from the vehicle consist that includes the first propulsion unit 900. The second de-linking signal 1104 can include a replacement identity of a control unit on another propulsion unit.

The control unit 1002 of the third propulsion unit 1100 transmits a fourth linking signal 1106 to the control unit 902 of the first propulsion unit 900 when the third propulsion unit 1100 is to connect with the vehicle consist as a lead propulsion unit. The fourth linking signal 1106 includes an identity of the control unit 1002 of the third propulsion unit 1100 and/or an identity of the third propulsion unit 1100. The control unit 902 of the first propulsion unit 900 compares the identity that is received via the fourth linking signal 1106 with the replacement identity that is received via the de-linking signal 1104. If the identities match or otherwise correspond with each other (e.g., by identifying the same control unit and/or propulsion unit), then the control unit 902 of the first propulsion unit 900 can be controllably linked with the control unit 1002 of the third propulsion unit 1100 such that the control unit 1002 can remotely control operations of the first propulsion unit 900.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one aspect, the remote propulsion unit prevents the first lead propulsion unit from remotely controlling operations of the remote propulsion unit when the remote propulsion unit is not controllably linked with the first lead propulsion unit.

In one aspect, the remote propulsion unit prevents the second lead propulsion unit from remotely controlling operations of the remote propulsion unit when the remote propulsion unit is not controllably linked with the second lead propulsion unit.

In another aspect, transmitting the linking signal occurs when both the first lead propulsion unit and the remote propulsion unit are mechanically coupled with the vehicle consist.

In another aspect, the method also includes inputting the designated identity into a memory disposed onboard the remote propulsion unit.

In another aspect, the method further includes confirming that the second lead propulsion unit can control the operations of the remote propulsion unit by comparing the second identity in the linking signal to the replacement identity that is received onboard the remote propulsion unit, and transmitting a confirmation signal from the remote propulsion unit to the second lead propulsion unit that confirms that the second lead propulsion unit can control the operations of the remote propulsion unit.

In another aspect, at least one of transmitting the linking signal, transmitting the de-linking signal, or transmitting the replacement linking signal occurs over a wireless connection between the remote propulsion unit and one or more of the first lead propulsion unit or the second lead propulsion unit.

In another aspect, at least one of transmitting the linking signal, transmitting the de-linking signal, or transmitting the replacement linking signal occurs over a wired connection between the remote propulsion unit and one or more of the first lead propulsion unit or the second lead propulsion unit.

In another aspect, the method also includes storing the replacement identity in a memory disposed onboard the remote propulsion unit so that the replacement identity in the de-linking signal can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, transmitting the de-linking signal to the remote propulsion unit notifies the remote propulsion unit that the first propulsion unit is to be mechanically decoupled from the vehicle consist.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In another aspect, receiving the linking signal occurs when both the first lead propulsion unit and the remote propulsion unit are mechanically coupled with the vehicle consist.

In another aspect, the method also includes receiving the designated identity into a memory disposed onboard the remote propulsion unit.

In another aspect, the method also includes confirming that the second lead propulsion unit can control the operations of the remote propulsion unit by comparing the second identity in the linking signal to the replacement identity that is received onboard the remote propulsion unit, wherein transmitting the second confirmation signal is performed when the second identity corresponds to the replacement identity.

In another aspect, at least one of receiving the linking signal, receiving the de-linking signal, or receiving the replacement linking signal occurs over a wireless connection between the remote propulsion unit and one or more of the first lead propulsion unit or the second lead propulsion unit.

In another aspect, at least one of receiving the linking signal, receiving the de-linking signal, or receiving the replacement linking signal occurs over a wired connection between the remote propulsion unit and one or more of the first lead propulsion unit or the second lead propulsion unit.

In another aspect, the method further includes storing the replacement identity in a memory disposed onboard the remote propulsion unit so that the replacement identity can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, the de-linking signal notifies the remote propulsion unit that the first propulsion unit is to be mechanically decoupled from the vehicle consist.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system when the remote propulsion unit verifies that the lead propulsion unit can control operations of the remote propulsion unit.

In another aspect, transmitting the de-linking signal occurs over a wireless connection between the remote propulsion unit and the lead propulsion unit.

In another aspect, transmitting the de-linking signal occurs over a wired connection between the remote propulsion unit and the lead propulsion unit.

In another aspect, at least one of the propulsion units other than the lead propulsion unit can control the operations of the remote propulsion unit only when the replacement identity that is transmitted in the de-linking signal corresponds to a second identity of the at least one of the propulsion units.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In another aspect, the first communication interface is configured to transmit the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit. The second communication interface can be configured to transmit a confirmation signal from the remote propulsion unit to the second lead propulsion unit that confirms that the second lead propulsion unit can control the operations of the remote propulsion unit.

In another aspect, at least one of the first communication interface, the second communication interface, or the third communication interface is configured to communicate the linking signal, the de-linking signal, or the replacement linking signal over a wireless connection between the remote propulsion unit and one or more of the first lead propulsion unit or the second lead propulsion unit.

In another aspect, at least one of the first communication interface, the second communication interface, or the third communication interface is configured to communicate the linking signal, the de-linking signal, or the replacement linking signal over a wired connection between the remote propulsion unit and one or more of the first lead propulsion unit or the second lead propulsion unit.

In another aspect, the setup unit is configured to store the replacement identity in a memory disposed onboard the remote propulsion unit so that the replacement identity in the de-linking signal can be compared to the second identity in the replacement linking signal when the replacement linking signal is received.

In another aspect, the setup unit controllably links the remote propulsion unit and the second lead propulsion unit in a distributed power system when the second identity in the replacement linking signal corresponds to the replacement identity in the de-linking signal.

In another aspect, the first communication unit is configured to transmit the de-linking signal to the remote propulsion unit in order to notify the remote propulsion unit that the first unit is to be mechanically decoupled from the vehicle consist.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit is configured to allow the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In another aspect, the communication unit is configured to receive the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit.

In another aspect, the remote propulsion unit and the second lead propulsion unit are controllably linked in a distributed power system by the setup unit when the second identity in the replacement linking signal corresponds to the replacement identity in the de-linking signal.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one aspect, the remote propulsion unit prevents the first lead propulsion unit from remotely controlling operations of the remote propulsion unit when the remote propulsion unit is not controllably linked with the first lead propulsion unit.

In one aspect, the remote propulsion unit prevents the second lead propulsion unit from remotely controlling operations of the remote propulsion unit when the remote propulsion unit is not controllably linked with the second lead propulsion unit.

In another aspect, transmitting the linking signal occurs when both the first lead propulsion unit and the remote propulsion unit are mechanically coupled with the vehicle consist.

In another aspect, the method also includes inputting the designated identity into a memory disposed onboard the remote propulsion unit.

In another aspect, the method further includes confirming that the second lead propulsion unit can control the operations of the remote propulsion unit by comparing the second identity in the linking signal to the replacement identity that is received onboard the remote propulsion unit, and transmitting a confirmation signal from the remote propulsion unit to the second lead propulsion unit that confirms that the second lead propulsion unit can control the operations of the remote propulsion unit.

In another aspect, at least one of transmitting the linking signal, transmitting the de-linking signal, or transmitting the replacement linking signal occurs over a wireless connection between the remote propulsion unit and one or more of the first lead propulsion unit or the second lead propulsion unit.

In another aspect, at least one of transmitting the linking signal, transmitting the de-linking signal, or transmitting the replacement linking signal occurs over a wired connection between the remote propulsion unit and one or more of the first lead propulsion unit or the second lead propulsion unit.

In another aspect, the method also includes storing the replacement identity in a memory disposed onboard the remote propulsion unit so that the replacement identity in the de-linking signal can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, transmitting the de-linking signal to the remote propulsion unit notifies the remote propulsion unit that the first propulsion unit is to be mechanically decoupled from the vehicle consist.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In another aspect, receiving the linking signal occurs when both the first lead propulsion unit and the remote propulsion unit are mechanically coupled with the vehicle consist.

In another aspect, the method also includes receiving the designated identity into a memory disposed onboard the remote propulsion unit.

In another aspect, the method also includes confirming that the second lead propulsion unit can control the operations of the remote propulsion unit by comparing the second identity in the linking signal to the replacement identity that is received onboard the remote propulsion unit, wherein transmitting the second confirmation signal is performed when the second identity corresponds to the replacement identity.

In another aspect, at least one of receiving the linking signal, receiving the de-linking signal, or receiving the replacement linking signal occurs over a wireless connection between the remote propulsion unit and one or more of the first lead propulsion unit or the second lead propulsion unit.

In another aspect, at least one of receiving the linking signal, receiving the de-linking signal, or receiving the replacement linking signal occurs over a wired connection between the remote propulsion unit and one or more of the first lead propulsion unit or the second lead propulsion unit.

In another aspect, the method further includes storing the replacement identity in a memory disposed onboard the remote propulsion unit so that the replacement identity can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, the de-linking signal notifies the remote propulsion unit that the first propulsion unit is to be mechanically decoupled from the vehicle consist.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In another aspect, transmitting the de-linking signal occurs over a wireless connection between the remote propulsion unit and the lead propulsion unit.

In another aspect, transmitting the de-linking signal occurs over a wired connection between the remote propulsion unit and the lead propulsion unit.

In another aspect, at least one of the propulsion units other than the lead propulsion unit can control the operations of the remote propulsion unit only when the replacement identity that is transmitted in the de-linking signal corresponds to a second identity of the at least one of the propulsion units.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In another aspect, the first communication interface is configured to transmit the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit. The second communication interface can be configured to transmit a confirmation signal from the remote propulsion unit to the second lead propulsion unit that confirms that the second lead propulsion unit can control the operations of the remote propulsion unit.

In another aspect, at least one of the first communication interface, the second communication interface, or the third communication interface is configured to communicate the linking signal, the de-linking signal, or the replacement linking signal over a wireless connection between the remote propulsion unit and one or more of the first lead propulsion unit or the second lead propulsion unit.

In another aspect, at least one of the first communication interface, the second communication interface, or the third communication interface is configured to communicate the linking signal, the de-linking signal, or the replacement linking signal over a wired connection between the remote propulsion unit and one or more of the first lead propulsion unit or the second lead propulsion unit.

In another aspect, the setup unit is configured to store the replacement identity in a memory disposed onboard the remote propulsion unit so that the replacement identity in the de-linking signal can be compared to the second identity in the replacement linking signal when the replacement linking signal is received.

In another aspect, the setup unit controllably links the remote propulsion unit and the second lead propulsion unit in a distributed power system when the second identity in the replacement linking signal corresponds to the replacement identity in the de-linking signal.

In another aspect, the first communication unit is configured to transmit the de-linking signal to the remote propulsion unit in order to notify the remote propulsion unit that the first propulsion unit is to be mechanically decoupled from the vehicle consist.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit allows the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In another aspect, the communication unit is configured to receive the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit.

In another aspect, the remote propulsion unit and the second lead propulsion unit are controllably linked in a distributed power system by the setup unit when the second identity in the replacement linking signal corresponds to the replacement identity in the de-linking signal.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In another embodiment, a system (e.g., for controllably linking propulsion units) includes a control unit having a first communication interface and a first setup unit operably coupled with the first communication interface. The control unit is configured to be disposed onboard a first propulsion unit of a vehicle consist. The control unit is configured to operate in at least a first mode of operation, a different, second mode of operation, and a different, third mode of operation. When in the first mode of operation, the control unit is configured to transmit a first linking signal to a second propulsion unit in the vehicle consist. The first linking signal includes a first identity of the first propulsion unit for the first propulsion unit to control the second propulsion unit if the first identity corresponds to a first designated identity that is stored onboard the second propulsion unit. When in the second mode of operation, the control unit is configured to transmit a first de-linking signal to the second propulsion unit when the first propulsion unit is to be mechanically decoupled from the vehicle consist. The first de-linking signal includes a first replacement identity of a third propulsion unit that is to be mechanically coupled to the vehicle consist to replace the first propulsion unit, for the third propulsion unit to control the second propulsion unit if a second identity received by the second propulsion unit from the third propulsion unit in a second linking signal matches the first replacement identity. When in the third mode of operation, the control unit is configured to receive a third linking signal from the second propulsion unit, a second de-linking signal from the second propulsion unit, or a fourth linking signal from the third propulsion unit. When in the third mode of operation, the control unit also is configured to allow the second propulsion unit to control the first propulsion unit if a third identity in the third linking signal corresponds to a second designated identity stored onboard the first propulsion unit, or to allow the third propulsion unit to control the first propulsion unit if a fourth identity in the fourth linking signal corresponds to a second replacement identity received in the second de-linking signal from the second propulsion unit.

While the inventive subject matter has been described with reference to an embodiment, it will be understood by those of ordinary skill in the art that various changes, omissions, and/or additions may be made and equivalents may be substituted for elements thereof without departing from the spirit and scope of the inventive subject matter. Additionally, many modifications may be made to adapt a particular situation or material to the teachings of the inventive subject matter without departing from the scope thereof. Therefore, it is intended that the inventive subject matter not be limited to the particular embodiments disclosed as contemplated for carrying out the inventive subject matter, but that the inventive subject matter will include all embodiments falling within the scope of the appended claims. Moreover, unless specifically stated any use of the terms first, second, etc. do not denote any order or importance, but rather the terms first, second, etc. are used to distinguish one element from another.

The invention claimed is:

1. A method comprising:
   transmitting a linking signal from a first lead propulsion unit of a vehicle consist to a remote propulsion unit of the vehicle consist, the linking signal including a first identity of the first lead propulsion unit, the remote propulsion unit and the first lead propulsion unit controllably linked with each other when the first identity of the first lead propulsion unit in the linking signal corresponds to a designated identity that is stored onboard the remote propulsion unit, the remote propulsion unit allowing the first lead propulsion unit to remotely control operations of the remote propulsion unit when the first lead propulsion unit and the remote propulsion unit are controllably linked;
   transmitting a de-linking signal from the first lead propulsion unit to the remote propulsion unit when the first lead propulsion unit is to be mechanically decoupled from the vehicle consist, the de-linking signal including a replacement identity of a propulsion unit other than the first lead propulsion unit that is to be mechanically coupled to the vehicle consist to replace the first lead propulsion unit; and
   transmitting a replacement linking signal from a second lead propulsion unit to the remote propulsion unit, the replacement linking signal including a second identity of the second lead propulsion unit, wherein the remote propulsion unit and the second lead propulsion unit are controllably linked when the second identity of the second lead propulsion unit corresponds to the replacement identity received at the remote propulsion unit, wherein the remote propulsion unit allows the second lead propulsion unit to remotely control the operations of the remote propulsion unit when the second lead propulsion unit and the remote propulsion unit are controllably linked.

2. The method of claim 1, wherein the remote propulsion unit prevents the second lead propulsion unit from remotely controlling the operations of the remote propulsion unit when the remote propulsion unit and the second lead propulsion unit are not controllably linked.

3. The method of claim 1, further comprising:
   confirming that the second lead propulsion unit can control the operations of the remote propulsion unit by comparing the second identity in the replacement linking signal to the replacement identity that is received onboard the remote propulsion unit; and
   transmitting a confirmation signal from the remote propulsion unit to the second lead propulsion unit that confirms that the second lead propulsion unit can control the operations of the remote propulsion unit.

4. The method of claim 1, wherein at least one of transmitting the linking signal, transmitting the de-linking signal, or transmitting the replacement linking signal occurs over a wireless connection between the remote propulsion unit and one or more of the first lead propulsion unit or the second lead propulsion unit.

5. The method of claim 1, wherein at least one of transmitting the linking signal, transmitting the de-linking signal, or transmitting the replacement linking signal occurs over a wired connection between the remote propulsion unit and one or more of the first lead propulsion unit or the second lead propulsion unit.

6. The method of claim 1, further comprising storing the replacement identity in a memory disposed onboard the remote propulsion unit so that the replacement identity in the de-linking signal can be compared to the second identity in the replacement linking signal when the replacement linking signal is received.

7. The method of claim 1, wherein the remote propulsion unit and the second lead propulsion unit are controllably linked in a distributed power system when the second identity in the replacement linking signal corresponds to the replacement identity in the de-linking signal.

8. A method comprising:
receiving a linking signal from a first lead propulsion unit of a vehicle consist at a remote propulsion unit of the vehicle consist, the linking signal including a first identity of the first lead propulsion unit;
transmitting a first confirmation signal from the remote propulsion unit to the first lead propulsion unit to controllably link the remote propulsion unit with the first lead propulsion unit, the first confirmation signal transmitted when the first identity of the first lead propulsion unit in the linking signal corresponds to a designated identity that is stored onboard the remote propulsion unit, the remote propulsion unit allowing the first lead propulsion unit to remotely control operations of the remote propulsion unit when the first lead propulsion unit and the remote propulsion unit are controllably linked;
receiving a de-linking signal from the first lead propulsion unit at the remote propulsion unit when the first lead propulsion unit is to be mechanically decoupled from the vehicle consist, the de-linking signal including a replacement identity of a propulsion unit other than the first lead propulsion unit that is to be mechanically coupled to the vehicle consist to replace the first lead propulsion unit;
receiving a replacement linking signal from a second lead propulsion unit at the remote propulsion unit, the replacement linking signal including a second identity of the second lead propulsion unit; and
transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit, wherein the remote propulsion unit allows the second lead propulsion unit to remotely control the operations of the remote propulsion unit when the second lead propulsion unit and the remote propulsion unit are controllably linked.

9. The method of claim 8, further comprising confirming that the second lead propulsion unit can control the operations of the remote propulsion unit by comparing the second identity in the replacement linking signal to the replacement identity that is received onboard the remote propulsion unit, wherein transmitting the second confirmation signal is performed when the second identity corresponds to the replacement identity.

10. The method of claim 8, further comprising storing the replacement identity in a memory disposed onboard the remote propulsion unit so that the replacement identity can be compared to the second identity in the replacement linking signal when the replacement linking signal is received.

11. The method of claim 8, wherein the remote propulsion unit and the second lead propulsion unit are controllably linked in a distributed power system when the second identity in the replacement linking signal corresponds to the replacement identity in the de-linking signal.

12. The method of claim 8, wherein the de-linking signal notifies the remote propulsion unit that the first propulsion unit is to be mechanically decoupled from the vehicle consist.

13. A method comprising:
in a vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit;
controllably linking the remote propulsion unit with the lead propulsion unit when the first identity of the lead propulsion unit in the linking signal corresponds to a designated identity that is stored onboard the remote propulsion unit, the remote propulsion unit allowing the lead propulsion unit to remotely control operations of the remote propulsion unit when the lead propulsion unit and the remote propulsion unit are controllably linked; and
transmitting a de-linking signal from the lead propulsion unit to the remote propulsion unit when the lead propulsion unit is to be mechanically decoupled from the vehicle consist, the de-linking signal including a replacement identity of a propulsion unit other than the lead propulsion unit that is to be mechanically coupled to the vehicle consist to replace the lead propulsion unit, wherein the replacement identity is transmitted to the remote propulsion unit to permit the remote propulsion unit to verify which of the propulsion units in the vehicle consist can remotely control operations of the remote propulsion unit.

14. The method of claim 13, wherein the propulsion units of the vehicle consist are controllably linked with each other in a distributed power system when the remote propulsion unit verifies that the lead propulsion unit can control operations of the remote propulsion unit.

15. The method of claim 13, wherein transmitting the de-linking signal occurs over a wireless connection between the remote propulsion unit and the lead propulsion unit.

16. The method of claim 13, wherein transmitting the de-linking signal occurs over a wired connection between the remote propulsion unit and the lead propulsion unit.

17. The method of claim 13, wherein at least one of the propulsion units other than the lead propulsion unit can control the operations of the remote propulsion unit only when the replacement identity that is transmitted in the de-linking signal corresponds to a second identity of the at least one of the propulsion units.

18. A system comprising:
a first communication interface configured to be disposed onboard a first lead propulsion unit of a vehicle consist, the first communication interface configured to transmit a linking signal from the first lead propulsion unit to a remote propulsion unit of the vehicle consist, the linking signal including a first identity of the first lead propulsion unit;
a second communication interface configured to be disposed onboard the remote propulsion unit and to receive the linking signal from the first lead propulsion unit;
a setup unit configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit, the setup unit allowing the remote propulsion unit to be remotely controlled by the first lead propulsion unit when the first and second communication interfaces are controllably linked;
wherein the first communication interface is configured to transmit a de-linking signal from the first lead propulsion unit to the remote propulsion unit when the first lead propulsion unit is to be mechanically decoupled from the vehicle consist, the de-linking signal including a replacement identity of a propulsion unit other than the first lead propulsion unit that is to be mechanically coupled to the vehicle consist to replace the first lead propulsion unit; and a third communication interface configured to be disposed onboard a second lead propulsion unit of the vehicle consist, the third communication interface configured to transmit a replacement linking signal to the remote propulsion unit that includes a second identity of the second lead propulsion unit, wherein the setup unit is configured to controllably link the remote propulsion unit with the second lead propulsion unit when the second identity of the second lead propulsion unit corresponds to the replacement identity in the de-linking signal that is received at the remote propulsion unit, the setup unit also configured to allow the second lead propulsion unit to remotely control operations of the remote propulsion unit when the second lead propulsion unit and the remote propulsion unit are controllably linked.

19. The system of claim 18, wherein the setup unit is configured to confirm that the second lead propulsion unit can control the operations of the remote propulsion unit by comparing the second identity in the linking signal to the replacement identity that is received onboard the remote propulsion unit, and the second communication interface is configured to transmit a confirmation signal from the remote propulsion unit to the second lead propulsion unit that confirms that the second lead propulsion unit can control the operations of the remote propulsion unit.

20. The system of claim 18, wherein the setup unit is configured to store the replacement identity in a memory disposed onboard the remote propulsion unit so that the replacement identity in the de-linking signal can be compared to the second identity in the replacement linking signal when the replacement linking signal is received.

21. The system of claim 18, wherein the setup unit controllably links the remote propulsion unit and the second lead propulsion unit in a distributed power system when the second identity in the replacement linking signal corresponds to the replacement identity in the de-linking signal.

22. A system comprising:
a communication interface configured to be disposed onboard a remote propulsion unit of a vehicle consist, the communication interface configured to receive a linking signal from a first lead propulsion unit of the vehicle consist that includes a first identity of the first lead propulsion unit; and a setup unit configured to be disposed onboard the remote propulsion unit, the setup unit configured to controllably link the remote propulsion unit with the first lead propulsion unit when the first identity of the first lead propulsion unit in the linking signal corresponds to a designated identity that is stored onboard the remote propulsion unit, the setup unit allowing the first lead propulsion unit to remotely control operations of the remote propulsion unit when the first lead propulsion unit and the remote propulsion unit are controllably linked;

wherein the communication interface is configured to receive a de-linking signal from the first lead propulsion unit when the first lead propulsion unit is to be mechanically decoupled from the vehicle consist, the de-linking signal including a replacement identity of a propulsion unit other than the first lead propulsion unit that is to be mechanically coupled to the vehicle consist to replace the first lead propulsion unit, the communication interface also configured to receive a replacement linking signal from a second lead propulsion unit at the remote propulsion unit, the replacement linking signal including a second identity of the second lead propulsion unit;

wherein the setup unit is further configured to allow the remote propulsion unit to be controlled by the second lead propulsion unit when the second identity of the second lead propulsion unit corresponds to the replacement identity in the de-linking signal that is received at the remote propulsion unit.

23. The system of claim 22, wherein the setup unit is configured to confirm that the second lead propulsion unit can control the operations of the remote propulsion unit by comparing the second identity in the replacement linking signal to the replacement identity that is received onboard the remote propulsion unit.

24. The system of claim 22, wherein the remote propulsion unit and the second lead propulsion unit are controllably linked in a distributed power system by the setup unit when the second identity in the replacement linking signal corresponds to the replacement identity in the de-linking signal.

25. A system comprising:
a communication interface configured to be disposed onboard a lead propulsion unit of a vehicle consist having plural propulsion units configured to propel the vehicle consist, the communication interface configured to transmit a linking signal to a remote propulsion unit of the propulsion units, the linking signal including a first identity of the lead propulsion unit;

a setup unit configured to be disposed onboard the remote propulsion unit and further configured to controllably link the remote propulsion unit with the lead propulsion unit when the first identity of the lead propulsion unit in the linking signal corresponds to a designated identity that is stored onboard the remote propulsion unit, the setup unit configured to allow the lead propulsion unit to remotely control operations of the remote propulsion unit when the lead propulsion unit and the remote propulsion unit are controllably linked; and wherein the communication interface also is configured to transmit a de-linking signal to the remote propulsion unit when the lead propulsion unit is to be mechanically decoupled from the vehicle consist, the de-linking signal including a replacement identity of a propulsion unit other than the lead propulsion unit that is to be mechanically coupled to the vehicle consist to replace the lead propulsion unit, wherein the replacement identity is transmitted to the remote propulsion unit to permit the remote propulsion unit to verify which of the propulsion units in the vehicle consist can remotely control operations of the remote propulsion unit.

26. The system of claim 25, wherein the de-linking signal notifies the remote propulsion unit that the first propulsion unit is to be mechanically decoupled from the vehicle consist.

27. The system of claim 25, wherein the propulsion units of the vehicle consist are controllably linked with each other in a distributed power system.

28. A system comprising:
a control unit comprising a first communication interface and a first setup unit operably coupled with the first communication interface, wherein the control unit is configured to be disposed onboard a first propulsion unit of a vehicle consist;

wherein the control unit is configured to operate in at least a first mode of operation, a different, second mode of operation, and a different, third mode of operation;

wherein the control unit is configured, when in the first mode of operation, to transmit a first linking signal to a second propulsion unit in the vehicle consist, the first linking signal including a first identity of the first propulsion unit for the first propulsion unit to control the second propulsion unit if the first identity corresponds to a first designated identity that is stored onboard the second propulsion unit;

wherein the control unit is configured, when in the second mode of operation, to transmit a first de-linking signal to the second propulsion unit when the first propulsion unit is to be mechanically decoupled from the vehicle consist, the first de-linking signal including a first replacement identity of a third propulsion unit that is to be mechanically coupled to the vehicle consist to replace the first propulsion unit, for the third propulsion unit to control the second propulsion unit if a second identity received by the second propulsion unit from the third propulsion unit in a second linking signal matches the first replacement identity; and wherein the control unit is configured, when in the third mode of operation, to receive a third linking signal from the second propulsion unit, a second de-linking signal from the second propulsion unit, or a fourth linking signal from the third propulsion unit, and to allow the second propulsion unit to control the first propulsion unit if a third identity in the third linking signal corresponds to a second designated identity stored onboard the first propulsion unit, or to allow the third propulsion unit to control the first propulsion unit if a fourth identity in the fourth linking signal corresponds to a second replacement identity received in the second de-linking signal from the second propulsion unit.

* * * * *